Figure 4:
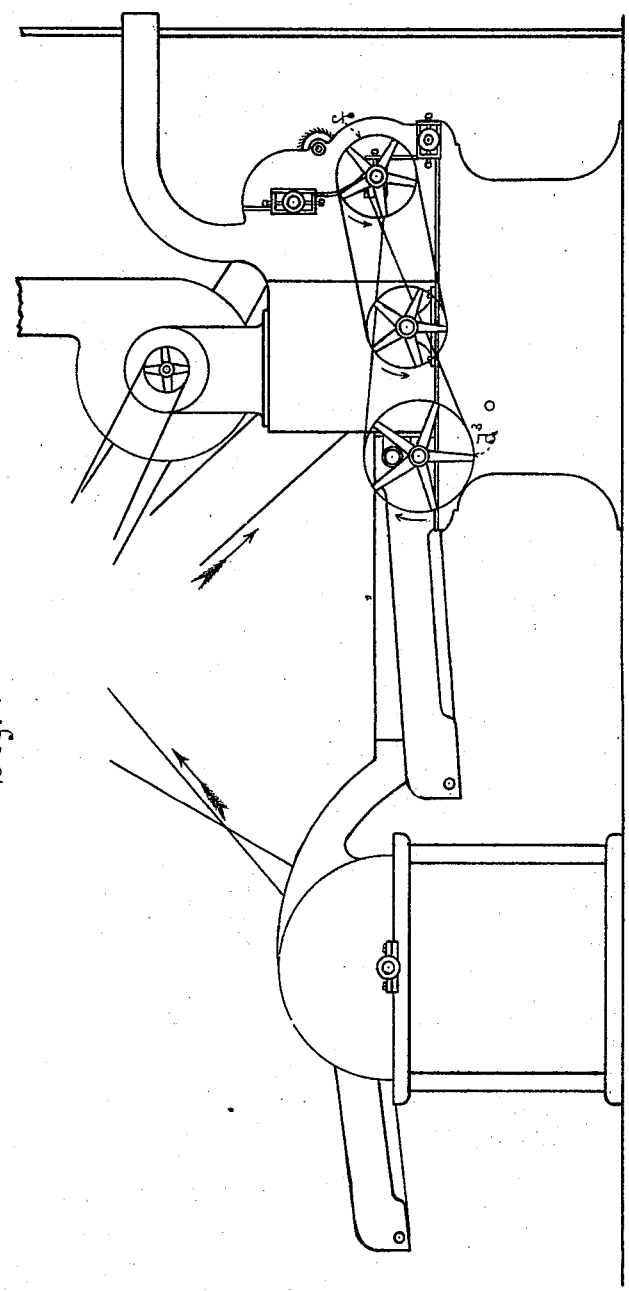

(No Model.) 3 Sheets—Sheet 1.
F. G. & A. C. SARGENT.
MACHINE FOR OPENING AND PREPARING WOOL OR OTHER FIBERS.
No. 506,445. Patented Oct. 10, 1893.
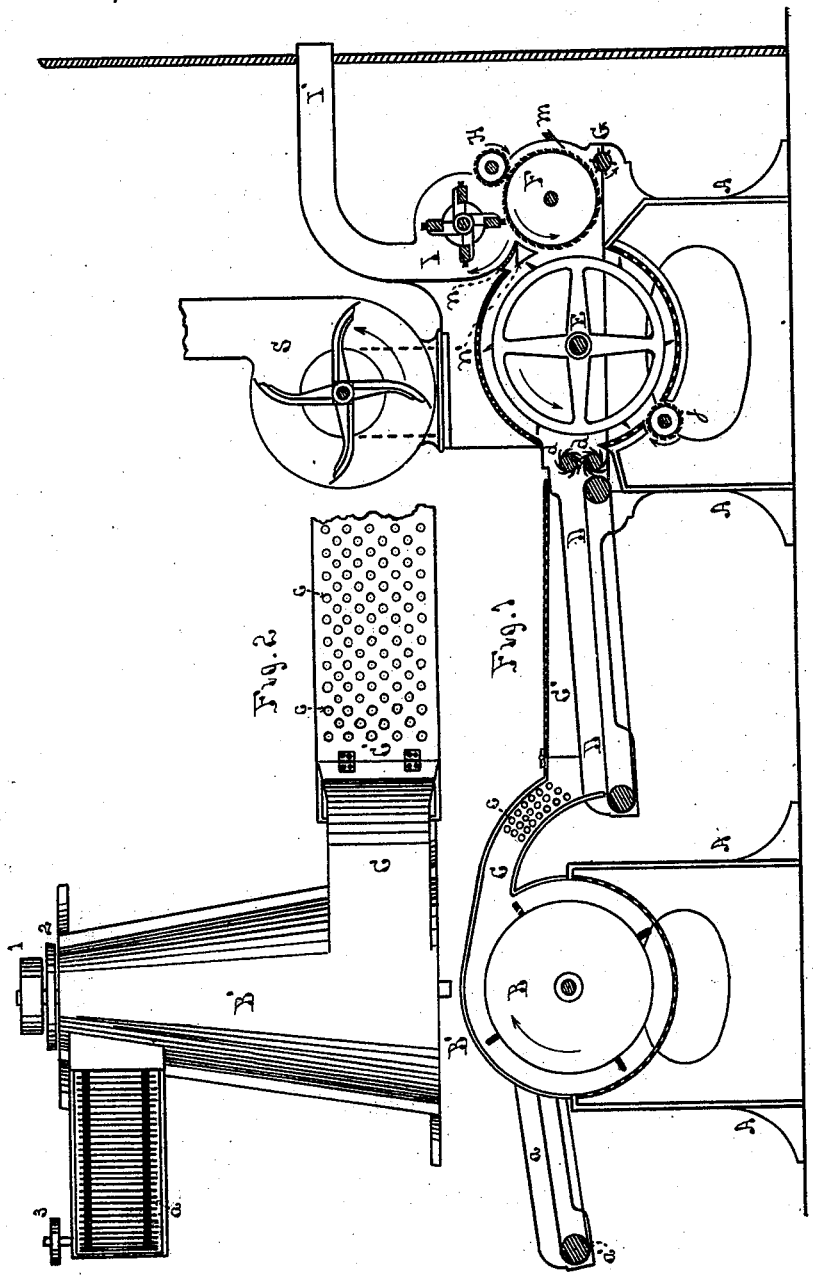
Witnesses
Wm. S. Brown
N. P. Ockington
Inventors
Frederick G. Sargent
Allan C. Sargent
By David Wallace
Their Atty

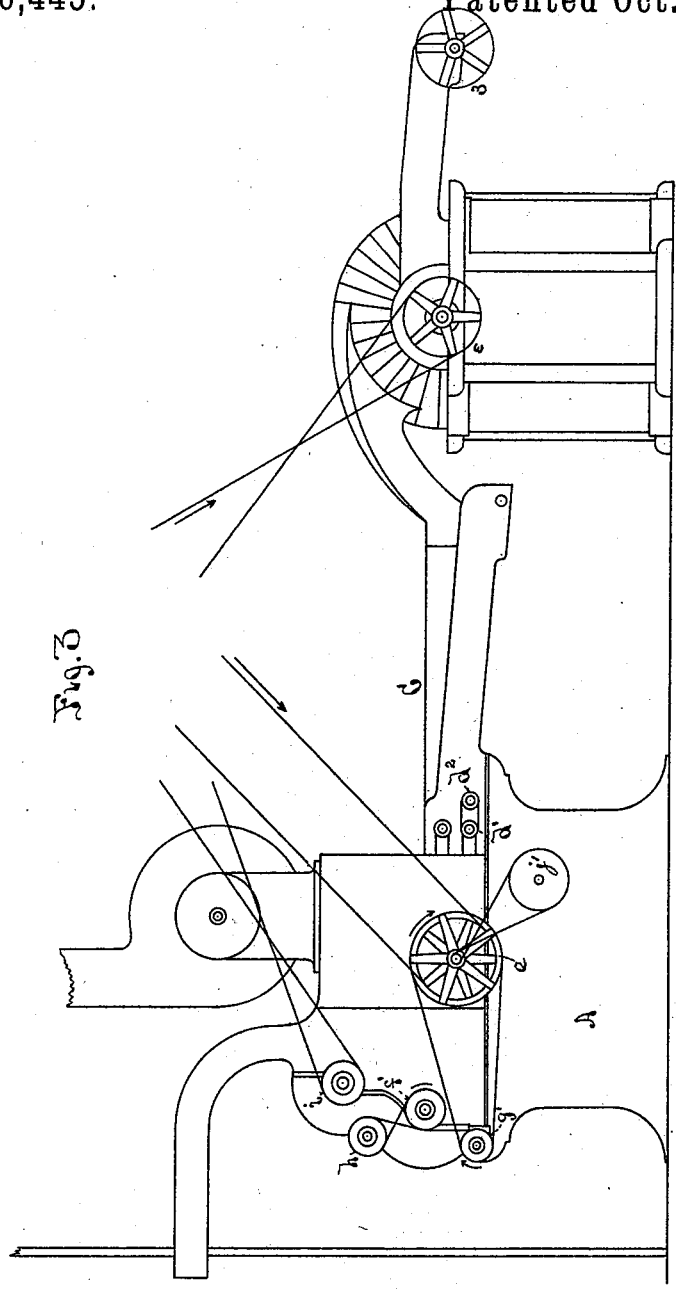

UNITED STATES PATENT OFFICE.

FREDERICK G. SARGENT AND ALLAN C. SARGENT, OF GRANITEVILLE, MASSACHUSETTS.

MACHINE FOR OPENING AND PREPARING WOOL OR OTHER FIBERS.

SPECIFICATION forming part of Letters Patent No. 506,445, dated October 10, 1893.

Application filed July 13, 1882. Serial No. 66,616. (No model.)

*To all whom it may concern:*

Be it known that we, FREDERICK G. SARGENT and ALLAN C. SARGENT, of Graniteville, in the county of Middlesex and State of Massachusetts, have invented a new and useful Improvement in Machines for Opening and Preparing Wool or other Fibers, of which the following if a specification.

Our invention relates to machines for opening, burring and preparing wool and other similar fiber and it consists; first, in the connection of a cone duster with the feed rolls and picker cylinder in such manner that the fiber is first passed through the cone duster and then to the feed rolls and picker cylinder; secondly, in connecting the cone duster with the feed rolls and picker cylinder by means of a perforated tube or conduit to enable the draft of air created by the cone duster to escape before effecting the passage of the fiber through the feed rolls and picker cylinder; third, in forming the portion of such tube or conduit above the feed apron of the picker cylinder removable and hinging the same so that it may be readily swung back to enable the picker cylinder to be used for opening fiber independently of the cone duster when desired.

In the drawings Figure 1. represents a vertical section through a machine constructed according to our improvements. Fig. 2. represents a top view of the cone duster and its perforated tube leading to the picker cylinder. Fig. 3. represents a view of the machine upon one side. Fig. 4. represents a view of the machine upon the other side.

A is the frame of the machine.

B is the cone duster within its bonnet B'.

$a$ is the feed apron of the cone duster.

$a'$ is one of the rollers around which the feed apron passes in the usual manner, being driven by a pulley 3 attached to the roller. The cone duster is constructed in the ordinary and well known manner and is driven by a pulley 1 attached to its shaft.

C is a tube or conduit leading from the large end of the cone duster to the feed apron D and feed rolls $d\ d$ and picker cylinder E, the lower feed roll being belted to the roll nearest to it which drives the apron by pulleys $d'\ d^2$ upon their respective shafts, as shown. A portion of this tube or passage is formed by the cover C' which is hinged as shown so as to allow it to be thrown back and expose the feed apron D of the picker cylinder. The tube C and its cover C' are perforated with holes $c\ c$ as shown in order to allow the draft of air created by the cone duster to escape as the fiber is thrown upon the feed apron D through the pipe C. The apron D, feed rolls $d\ d$, picker cylinder E and its bonnet are made in the ordinary manner with slats or openings as indicated in the drawings to permit the dust and burrs to escape from the fiber while operated upon by the picker cylinder. The picker cylinder is driven by pulley $e$ from a countershaft. The lower feed roll is driven by pulley $d^3$ belted to the shaft of the burring cylinder.

S is the fan adjacent to the picker cylinder and operated in the usual manner to create a draft of air for carrying off the dirt and impurities.

In the bonnet of the picker cylinder and underneath it we place a worker cylinder $j$ provided with teeth similar to those of a burring cylinder but projecting in a direction opposite to the direction of the teeth of the picker cylinder where these come nearest to the teeth of the worker cylinder. The worker cylinder $j$ has a surface movement in the same direction as that of the picker cylinder where they are adjacent to each other, but the surface and teeth of the worker cylinder $j$ move at a slower rate of speed than that of the surface of the picker cylinder. The worker cylinder $j$ has its motion given to it by being rotated upon its axis in the ordinary manner, that is, by the pulley $j'$ on its shaft belted from the shaft of the picker cylinder.

F is the burring cylinder which is driven from a pulley on the picker cylinder shaft by its pulley $f$, and takes the fiber from the picker cylinder in the usual manner.

G is the rotating striker which knocks the burrs from the fiber as the burring cylinder passes it and is driven by its pulley $g'$ as shown.

Heretofore the revolution of the burring cylinder F has created a draft of air within its bonnet which caused some of the burrs and impurities, after being knocked off by the striker G, to pass around upward within the bonnet of the burring cylinder in the same direction in which it rotated. We place within this bonnet a straight edge m as shown extending horizontally the whole length of the burring cylinder and brought only near enough to the latter to allow the fiber to pass it readily as carried by the teeth of the burring cylinder, while it intercepts the draft of air and burrs carried around by it, and causes them to drop from the striker downward and pass away.

I is the doffer of the burring cylinder driven by its pulley i from a countershaft placed in the usual position and surrounded with a bonnet and having a conduit I' leading away from it, through which the fiber is blown when removed from the burring cylinder.

Above the burring cylinder we place the worker cylinder H in such a position in relation to the doffer I that the latter will doff it as well as the burring cylinder. The teeth of the worker cylinder H project in a direction opposite to the direction of the teeth of the burring cylinder where these come nearest to the teeth of the worker cylinder, as shown and the worker cylinder is so rotated on its axis that its surface speed is less than that of the burring cylinder. The teeth of the worker cylinder come so near those of the burring cylinder as to take hold of and materially assist in opening up the fiber as it is carried around on the burring cylinder, while any particles of fiber adhering to the teeth of the worker cylinder are removed by the doffer I. The worker cylinder is driven by its pulley h which is belted to the pulley f' on the shaft of the burring cylinder as shown.

At n in the bonnet of the doffer I, we construct slats or openings leading into the short conduit n' which opens in upon the picker cylinder. The openings at n allow the heavier particles of unopened wool which are not carried away by the air draft through the tube I' to drop through upon the picker cylinder and be further opened by the machine. Heretofore the openings at n have led into a separate chamber from whence these heavier unopened particles of fiber were drawn off by the fan S.

Previously to our invention the cone duster has been attached to the passage I' leading from the picker cylinder and burring cylinder and the fiber has been subjected to the action of the latter first before entering the cone duster. By our arrangement the cone duster is made to operate upon the fiber first and we find a great advantage to arise from the arrangement in producing cleaner and better fiber from the machine.

When we desire to use the picker cylinder without the cone duster the cover C' of the passage C is swung upward and backward against the latter upon its hinges and the apron D of the picker cylinder is thus exposed and ready for use in the same manner as in ordinary machines.

In former machines the cone duster having the fiber blown directly into it from the burring cylinder required no apron, but we have added the apron a to enable it to be fed by hand in our new arrangement of it.

In order to connect the cone duster with the passage-way leading to the picker cylinder, it will be observed that it becomes necessary to attach such intervening passageway to the conical casing of the cone duster at the extreme larger end thereof, and also to lead it away from this casing at a right angle thereto. Thus the centrifugal force of the fingers of the cone duster are made to throw the fiber out into this intermediate passage, after conveying it through the length of the conical casing, in such shape or breadth and thickness of sheet of fiber as to have it properly enter the feed rolls of the picker cylinder evenly across the breadth of that machine. But as the fiber, in passing through the cone duster, arrives at one side or edge of this passageway C leading out of its conical casing first, it is evident that unless prevented in some way the fiber would all be thrown out on this side of passageway C at which it arrives. This difficulty has heretofore been supposed to effectively prevent the connection of cone dusters with other machines following them and requiring the fiber to be fed to them in a broad and substantially even and thin sheet. We have, however, discovered that we can overcome this difficulty by giving to the out-feed passage C a certain shape and proportion, with relation to the taper and diameter of the shell of the cone duster and its consequent rate of spiral feed through itself in the dusting process, by which shape and proportion of the outgoing passage C, the rate of spiral feed of the fiber toward its larger end in the cone duster will bring it opposite to the out-feed passage C in a substantially thin even sheet and deliver it into the passage in that shape. It will also be found that the taper of the casing of the cone duster and its consequent rapidity of feed of the fiber through it must be made such as to allow the feed-out passage C to approximate in breadth to the width of the sheet of fiber, which is to be fed to the picker cylinder by its rolls, as these have a direct relation to each other. It would be manifestly impossible to state any proportions of the taper of the cone duster casing to the breadth and depth of its out-feed passage, as the requirements of different pickers are so various, and even different longer or shorter staples of wool require a variation within certain limits to be given to these proportions and relations of the several parts, and they can best be found by experiment. By thus constructing and organizing the several parts with relation to each other, we are enabled to deliver the wool direct from the cone duster to the picker and avoid felting or exposure of it to injurious gases, often found in the mill, which is economical as well as advantageous.

What we claim as new and of our invention is—

1. The combination of the cone duster having a tapering casing, with the picker cylinder, feed rolls $d, d$, having means as described for operating the same, and the intermediate tube C leading out of the larger end of the cone duster casing substantially as described.

2. The combination of the cone duster having a tapering casing, with the picker cylinder, and intermediate perforated tube or passage leading out of the larger end of the cone duster casing, substantially as described.

3. The combination of the cone duster having a tapering casing, the picker cylinder, the passage C connecting them and leading out of the larger end of the cone duster casing, the feed apron D located in said passage, and means for operating the same substantially as described.

4. In combination with the cone duster having a tapering casing, and picker cylinder, intermediate passage C leading out of the larger end of the cone duster casing and provided with feed apron D and the removable cover of said passage, C, substantially as described.

5. The combination of the cone duster having a tapering casing, the intermediate passage C leading out of the larger end of said casing, the picker cylinder, and the feed apron $a$ with means for operating the same substantially as described.

F. G. SARGENT.
ALLAN C. SARGENT.

Witnesses:
H. W. CHURCH,
ARTHUR B. PLIMPTON.